No. 664,770. Patented Dec. 25, 1900.
J. P. MEYER.
ROLL HOLDING PHOTOGRAPHIC CAMERA.
(Application filed June 20, 1900.)
(No Model.)
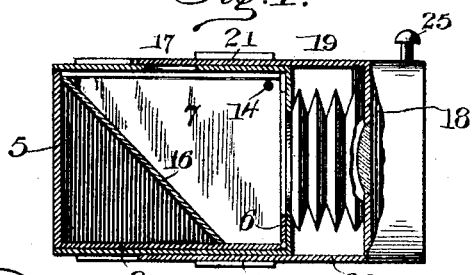
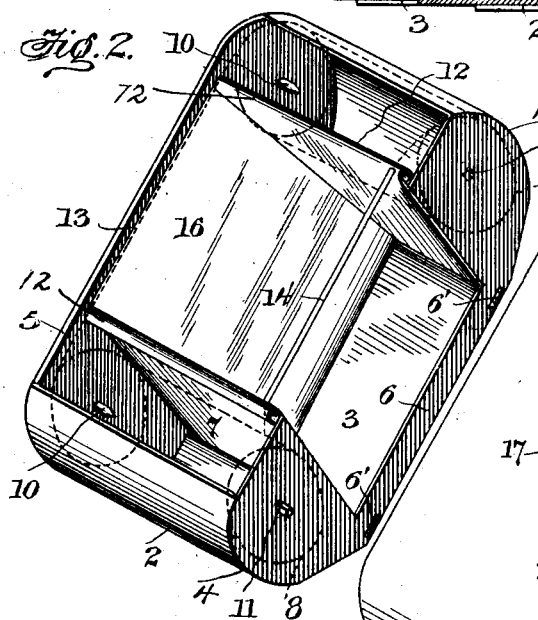
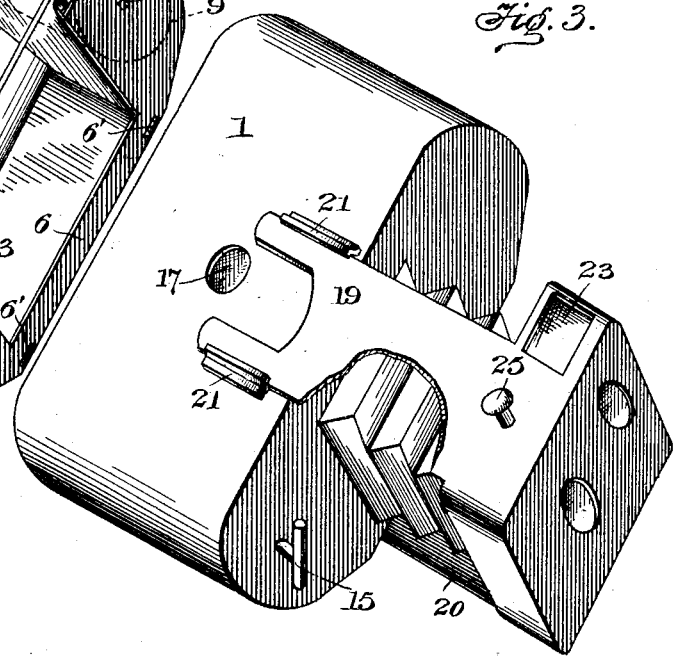
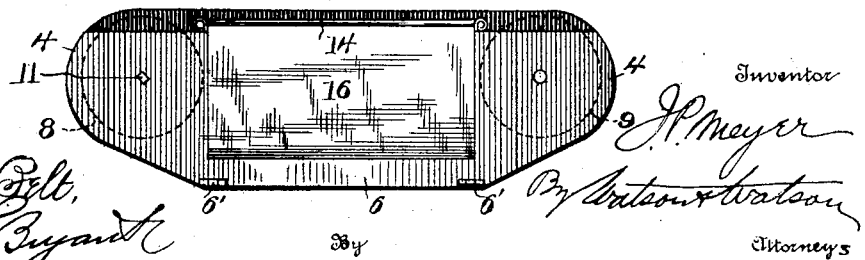
Witnesses
Fenton S. Belt,
Arthur L. Bryant
Inventor
J. P. Meyer
By Watson & Watson
Attorneys
THE NORRIS PETERS CO., PHOTO-LITHO., WASHINGTON, D. C.

UNITED STATES PATENT OFFICE.

JOSEPH P. MEYER, OF ROCHESTER, NEW YORK.

ROLL-HOLDING PHOTOGRAPHIC CAMERA.

SPECIFICATION forming part of Letters Patent No. 664,770, dated December 25, 1900.

Application filed June 20, 1900. Serial No. 20,995. (No model.)

*To all whom it may concern:*

Be it known that I, JOSEPH P. MEYER, a citizen of the United States, residing at Rochester, in the county of Monroe and State of New York, have invented certain new and useful Improvements in Cameras, of which the following is a specification.

My invention relates to improvements in pocket-cameras; and its object is to simplify and cheapen the construction of such cameras and render them compact and convenient.

The invention will be fully described hereinafter, with reference to the accompanying drawings, in which—

Figure 1 is a vertical sectional view of a camera embodying my invention. Fig. 2 is a perspective view of the film-holding devices. Fig. 3 is a perspective view of the outer casing. Fig. 4 is a front face view of the film-holding devices.

The body of the camera consists of a flat elongated casing 1. The rear of this casing is open, and in it fits a film-holder 2. The film-holder and the outer casing are preferably constructed of sheet metal, the latter being suitably covered with leather or other material to improve its appearance and finish. The film-holder has a bottom 3, curved ends 4, a back 5, and a swinging front piece 6. The interior of the film-holder is divided into three compartments or chambers by means of partition-plates 7, extending from the back to the front and from the bottom to the top of the film-holder. The film is supported upon spools 8 9, (indicated in dotted lines in Fig. 2,) which spools are arranged in the end compartments of the film-holder between the partitions 7 and the curved ends 4. Each spool is supported upon pins 10 11, secured, respectively, to the back 5 and front 6 of the film-holder. The upper edges 12 of the partition-plates are curled, as shown in the drawings, to afford a smooth bearing for the film 13, (also indicated in dotted lines,) and said plates are connected near such curved upper edges, at the forward end of the film-holder, by a brace-rod 14. This rod assists in supporting the forward edge of the film at points between the partition-plates. The spool 8 may be turned to expose new portions of the film by means of a suitable post and key 15.

A mirror 16 is arranged within the film-holder, between the partition-plates 7, in such manner as to receive rays from the lens and reflect them up against the portion of the film lying between said partitions. An opening 17 is provided in the outer casing 1, through which the back of the film may be inspected as it is adjusted in order to locate the successive sections properly in the field of the lens.

By reference to Fig. 4 it will be seen that the front 6 of the film-holder is of such form as to afford no obstruction to the passage of rays from the lens to the mirror 16, but completely closes the front ends of the spool-chambers. This front may be connected to the bottom of the film-holder by hinges 6' and be secured in its closed position by any suitable fastening devices.

The lens-board 18 is supported by upper and lower slides 19 20, which are fitted to suitable guides 21 22, respectively, attached to the upper and lower sides of the casing 1. In front of the lens-board at one side of the lens is a view-finder 23 of ordinary construction. As any suitable style of shutter may be employed with such a camera as is above described, I have not thought it necessary to illustrate this feature of the device in detail. I may, for instance, employ such a shutter as is shown in my application for patent filed April 7, 1899, Serial No. 712,166. A push button or pin 25 for actuating the shutter mechanism is shown in Figs. 1 and 3.

From the above description and the drawings it will be seen that I have provided a very simple and compact camera consisting practically of but two members and requiring little, if any, adjustment when it is to be used and of such form as to be readily carried in a pocket. The film-holder is readily removed from the outer casing and the film-carrying spools easily detached from their supporting pins or studs by turning the hinged front of said film-holder downwardly. By giving the partition-plates the form shown and connecting them by the rod 14 I am enabled to support horizontally a relatively large section of film in a perfectly smooth condition.

Having thus described my invention, what I claim, and desire to secure by Letters Patent, is—

1. In a photographic camera, the inner removable casing comprising end compartments for film-rolls, a middle compartment having an inclined mirror therein, and partitions between the end and middle compartments over which the film passes.

2. In a photographic camera, the combination of an outer casing having a lens-board connected thereto, said casing being open at the back, with an inner casing having end compartments for the film-rolls, a middle compartment provided with an inclined mirror, and partitions between said middle and end compartments.

3. In a photographic camera, the inner removable casing comprising end compartments for the film-rolls, a middle compartment in which is an inclined mirror, and a hinged front piece adapted to close the forward ends of the roll-compartments and assist in supporting the film-rolls.

4. In a photographic camera, the combination of a casing having a lens-board connected thereto, a film-holder removably fitted in said casing and having its interior divided into three compartments by suitable partitions, stationary supports for film-rolls arranged within the end compartments of said holder, an inclined mirror arranged in the middle compartment of the film-holder to reflect rays upon the surface of a film extending between said partitions, and a roll-support hinged to the body of the film-holder and adapted to close the end compartments therein.

5. In a photographic camera, the combination of an outer casing having a lens-board connected thereto, a removable film-holder having two transverse partitions dividing it into three compartments, a brace-rod connecting said partitions at one end, and an inclined mirror arranged in the compartment between said partitions to reflect rays upon a film supported by said partitions while passing from one of the end compartments of the film-holder to the other.

In testimony whereof I affix my signature in presence of two witnesses.

JOSEPH P. MEYER.

Witnesses:
H. PERRY BLODGETT,
MICHAEL GRUNNAGEL.